W. PENDLEY & A. MOSS.
Harrow.

No. 226,675. Patented April 20, 1880.

Witnesses:
W. W. Mortimer
Chas. H. Isham

Inventors:
Wm. Pendley
Anderson Moss.
per
F. A. Lehmann, Atty.

UNITED STATES PATENT OFFICE.

WILLIAM PENDLEY AND ANDERSON MOSS, OF TALKING ROCK, GEORGIA, ASSIGNORS OF ONE-THIRD OF THEIR RIGHT TO J. E. STEPHENS, OF SAME PLACE.

HARROW.

SPECIFICATION forming part of Letters Patent No. 226,675, dated April 20, 1880.

Application filed February 3, 1880.

*To all whom it may concern:*

Be it known that we, WM. PENDLEY and ANDERSON MOSS, of Talking Rock, in the county of Pickens and State of Georgia, have invented certain new and useful Improvements in Harrows; and we do hereby declare the following to be a full, clear, and exact description of the invention, such as will enable others skilled in the art to which it pertains to make and use it, reference being had to the accompanying drawings, which form part of this specification.

Our invention relates to an improvement in harrows; and it consists in the combination of a revolving toothed cylinder, having a pinion on each end to mesh with the driving-wheels that are secured to the shaft, with a frame that is pivoted upon the main frame, and which raises and lowers the cylinder at the will of the operator.

The object of our invention is to produce a revolving harrow in which the teeth are driven directly from the shaft, and which can be raised above the ground as the machine is being driven from place to place.

Figure 1:
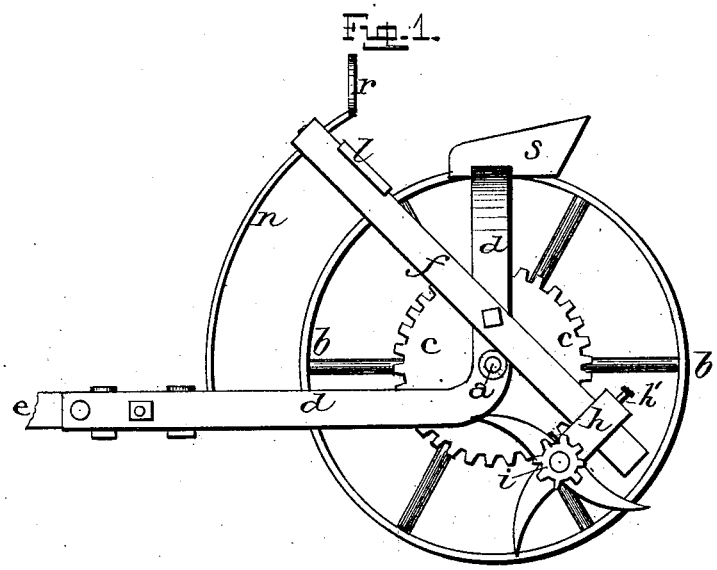
Figure 2:
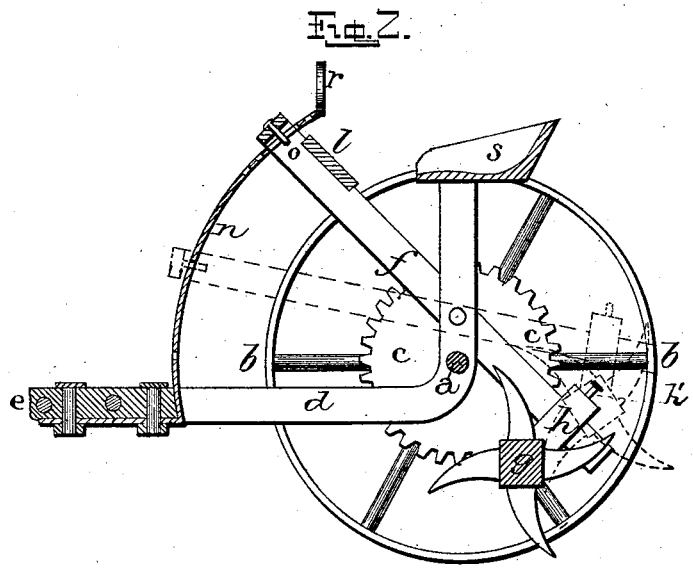

Figure 1 is a side elevation of our invention. Fig. 2 is a vertical section of the same.

*a* represents the axle, to each end of which is secured the driving-wheel *b* and large spur-wheel *c*.

The main frame *d* of this harrow is formed from one continuous piece of iron, which is bowed up in the center, passes down around both ends of the axle, is then bent horizontally forward, and has its two ends secured to the rear end of the tongue *e*. Pivoted to this main frame *d* a suitable distance above the axle is a second frame, *f*, which is made from a single piece of metal, and which has the revolving toothed cylinder *g*, journaled in the movable boxes *h*, placed upon its two rear ends. These boxes are made movable on the ends of the frame by set-screws *h'*, so that the toothed cylinder can be removed at any time desired, and so that the pinions *i* on the ends of the cylinder can be made to mesh with the wheels *c* at any desired point. Upon the front end of this frame *f* is secured the foot-board *l*, and projecting rearwardly from the inside of the frame is the pin or stud *o*, which catches in the curved spring *n* secured to the rear end of the tongue. This spring has a handle, *r*, formed on its upper end, and has a series of holes made through it for the stud to catch in, and thus hold the cylinder at any desired height above the ground.

The operator, sitting on the seat *s*, with his feet upon the foot-board, has only to pull the upper end of the spring *n* toward him to disengage the stud from it, when the weight of the cylinder will cause the rear end of the frame to drop down and the front end to rise up in front of the driver; or the driver, by pressing down on the foot-board, can raise the cylinder above the ground, so that the pinions are no longer in gear with the wheels *c*, and hence the cylinder will not revolve in turning around as the machine is moved to and from the field.

It will be noticed that, as the frame *f* is pivoted some distance above the center of the wheels *c*, the circle through which the pinions move is not the same as the circle formed by the wheels *c*, and hence when the frame *f* is in a horizontal position the pinions do not mesh with the wheels *c*; but when the front end of the frame is raised upward the pinions are lowered until they do mesh.

The shallower the revolving teeth are to cut the farther inward from the ends of the frame are the boxes moved, and the deeper the teeth are to cut the farther are they moved outward. By thus having the revolving cylinder placed upon a pivoted frame, as shown, the driver needs to use but one of his hands in raising and lowering the cylinder, while the other hand is left free to manage his team. When the cylinder is raised the machine can be readily turned around or backed.

The teeth are of the form shown, extend all the way through the beam, and are fastened in place by means of set-screws.

Having thus described our invention, we claim—

The combination of the frame $f$, journaled above the center of the wheels $c$, and having the revolving toothed cylinder provided with pinions journaled in movable boxes on its rear ends, the said boxes being adjustable to and from the wheels $c$, so as to regulate the point at which the pinions shall mesh with the wheels, as set forth.

In testimony that we claim the foregoing we have hereunto set our hands this 21st day of January, 1880.

WILLIAM PENDLEY.
ANDERSON MOSS.

Witnesses:
WILLIAM T. SHARPER,
JOHN W. ROE.